(12) United States Patent
Boccadamo et al.

(10) Patent No.: US 11,835,117 B2
(45) Date of Patent: Dec. 5, 2023

(54) VARIABLE SPEED TRANSMISSION AND SYSTEM USING SAME

(71) Applicant: Nuovo Pignone Tecnologie Srl, Florence (IT)

(72) Inventors: Gianluca Boccadamo, Florence (IT); Giuliano Milani, Florence (IT)

(73) Assignee: Nuovo Pignone Tecnologie—SRL

( * ) Notice: Subject to any disclaimer, the term of this patent is extended or adjusted under 35 U.S.C. 154(b) by 0 days.

(21) Appl. No.: 16/315,546

(22) PCT Filed: Jul. 7, 2017

(86) PCT No.: PCT/EP2017/067132
§ 371 (c)(1),
(2) Date: Jan. 4, 2019

(87) PCT Pub. No.: WO2018/007605
PCT Pub. Date: Jan. 11, 2018

(65) Prior Publication Data
US 2019/0154127 A1 May 23, 2019

(30) Foreign Application Priority Data

Jul. 8, 2016 (IT) .......................... 102016000071646

(51) Int. Cl.
*F16H 37/08* (2006.01)
*H02K 49/04* (2006.01)
(Continued)

(52) U.S. Cl.
CPC ......... *F16H 37/086* (2013.01); *F16D 35/005* (2013.01); *F16H 3/721* (2013.01);
(Continued)

(58) Field of Classification Search
CPC ...... F16H 37/084–2037/0893; F16H 2037/103
See application file for complete search history.

(56) References Cited

U.S. PATENT DOCUMENTS

| 2,161,894 A | 6/1939 | Bishop |
| 4,279,177 A | 7/1981 | Yamashita |

(Continued)

FOREIGN PATENT DOCUMENTS

| CN | 1959147 A | 5/2007 |
| DE | 102010014588 A1 | 11/2010 |

(Continued)

OTHER PUBLICATIONS

Search Report and Written Opinion issued in connection with corresponding IT Application No. 102016000071646 dated May 4, 2017.

(Continued)

*Primary Examiner* — Ernesto A Suarez
*Assistant Examiner* — Lillian T Nguyen
(74) *Attorney, Agent, or Firm* — Paul Frank + Collins P.C.

(57) ABSTRACT

The system includes: a driver; a rotating load configured to be driven into rotation by the driver; a controller, for controllably changing a rotation speed of the load; and a variable speed transmission, arranged between the driver and the load. The variable speed transmission includes a speed summing gear arrangement with a first input shaft, a second input shaft and an output shaft. The output shaft is drivingly coupled to the rotating load. The first input shaft is drivingly coupled to the driver. A continuous variable transmission device is mechanically coupled to the driver and to the second input shaft of the speed summing gear arrangement. The continuous variable transmission device is functionally coupled to the controller.

8 Claims, 9 Drawing Sheets

(51) Int. Cl.
*F16H 3/72* (2006.01)
*F16D 35/00* (2006.01)
*F16H 15/50* (2006.01)
*F16H 47/08* (2006.01)
*H02K 49/10* (2006.01)
*H02K 7/116* (2006.01)

(52) U.S. Cl.
CPC ........... *F16H 15/503* (2013.01); *F16H 47/08* (2013.01); *H02K 49/046* (2013.01); *H02K 49/108* (2013.01); *F16H 2037/088* (2013.01); *H02K 7/116* (2013.01); *H02K 2213/09* (2013.01)

(56) References Cited

U.S. PATENT DOCUMENTS

| | | | |
|---|---|---|---|
| 4,726,255 A | 2/1988 | Humpfer et al. | |
| 4,754,664 A | 7/1988 | Dick | |
| 5,201,690 A | 4/1993 | Dooner et al. | |
| 5,662,547 A * | 9/1997 | Moroto | F16H 37/0846 477/48 |
| 6,074,320 A * | 6/2000 | Miyata | F16H 37/084 475/186 |
| 6,155,951 A * | 12/2000 | Kuhn | F16H 37/084 475/207 |
| 6,251,039 B1 * | 6/2001 | Koga | F16H 37/086 475/216 |
| 6,293,888 B1 * | 9/2001 | Moon | F16H 37/0846 475/210 |
| 7,028,461 B2 | 4/2006 | Goi | |
| 9,777,815 B2 | 10/2017 | Phillips | |
| 2004/0224811 A1 | 11/2004 | Vornheim et al. | |
| 2005/0049109 A1 * | 3/2005 | Imanishi | F16H 61/6648 477/39 |
| 2006/0283185 A1 | 12/2006 | Wrona et al. | |
| 2007/0021259 A1 * | 1/2007 | Tenberge | F16H 37/0846 475/5 |
| 2009/0173318 A1 | 7/2009 | Grethel et al. | |
| 2009/0227407 A1 * | 9/2009 | Kamada | B60L 15/2054 475/5 |
| 2009/0291799 A1 * | 11/2009 | Scekic | F16H 3/72 475/269 |
| 2013/0023370 A1 | 1/2013 | Grad et al. | |
| 2013/0079191 A1 * | 3/2013 | Lohr | F16H 15/503 476/38 |
| 2013/0130857 A1 * | 5/2013 | Gassmann | F16H 37/082 475/150 |
| 2013/0133335 A1 | 5/2013 | Graf et al. | |
| 2013/0237365 A1 * | 9/2013 | Coffey | F16H 3/66 475/276 |
| 2014/0155220 A1 * | 6/2014 | Messier | F16H 37/022 476/33 |
| 2015/0141193 A1 * | 5/2015 | Parraga Gimeno | F16H 37/0846 475/211 |

FOREIGN PATENT DOCUMENTS

| | | |
|---|---|---|
| EP | 1479943 B1 | 8/2011 |
| EP | 2466729 A1 | 6/2012 |
| EP | 2620672 B1 | 5/2015 |
| EP | 2873892 A1 | 5/2015 |
| GB | 2054068 B | 4/1983 |
| JP | H0393455 A | 4/1991 |
| JP | H07208575 A | 8/1995 |
| JP | H08149790 A | 6/1996 |
| JP | 2002235558 A | 8/2002 |
| JP | 2003156072 A | 5/2003 |
| JP | 2005180522 A | 7/2005 |
| JP | 2016520782 A | 7/2016 |
| KR | 20050012605 A | 2/2005 |
| KR | 20160079478 A | 7/2016 |
| WO | 2008027342 A2 | 3/2008 |

OTHER PUBLICATIONS

PCT Search Report and Written Opinion issued in connection with corresponding Application No. PCT/EP2017/067132 dated Oct. 5, 2017.

* cited by examiner

VARIABLE SPEED TRANSMISSION AND SYSTEM USING SAME

TECHNICAL FIELD

The subject matter of the present disclosure relates to systems comprising a driven machine and a driver. More specifically, embodiments disclosed herein relate to systems where a constant-speed driver drives into rotation a variable-speed rotary machine, such as a compressor, or a compressor train, for instance.

BACKGROUND OF THE INVENTION

In several industrial applications a need exists for driving rotating load using drivers, which rotate at a constant rotational speed, such as electric motors. In some circumstances the rotating load is a turbomachine, such as a compressor. Large axial or centrifugal compressors are typically used in pipelines to pressurize gas to be transported along the pipeline. Large centrifugal or axial compressors are also used in so-called LNG applications, for the liquefaction of natural gas. Compressors are used in such installations to process refrigerant fluids, which are used in a closed cycle to chill the natural gas.

In some applications the rotational speed of the rotating load is required to change and may be modulated between e.g. about 70% and about 105% of the rated rotational speed. Electric motors can rotate at variable speed by interposing a variable frequency driver between the electrical distribution grid and the electric motor. Variable frequency drivers are complex, costly and cumbersome components, as they must convert very high power rates required by the electric motor. Typical applications of electric motors for driving large compressors may require powers of 1 to several tens of MW.

A need therefore exists for systems which allow a more convenient way of modulating the rotational speed of a variable-speed load driven by a driver.

SUMMARY OF THE INVENTION

According to one aspect, in order to address the above mentioned drawbacks of the prior art, a system is disclosed, comprising: a constant-speed driver, which may be configured for rotating at a substantially constant rotational speed; a rotating load configured to be driven into rotation by the driver at a possibly variable speed; a controller, for controllably changing a rotation speed of the load; a variable speed transmission, arranged between the constant-speed driver and the load. According to embodiments disclosed herein, the variable speed transmission can comprise a speed summing gear arrangement with a first input shaft, a second input shaft and an output shaft. In some embodiments the output shaft is drivingly coupled to the rotating load. The first input shaft can be drivingly coupled to the constant-speed driver. The speed of the output shaft is a function of the speeds of the first input shaft and of the second input shaft. A continuous variable transmission device can be mechanically coupled to the constant-speed driver, and therefore to the first input shaft of the speed summing gear arrangement, and to the second input shaft of the speed summing gear arrangement. The continuous variable transmission device is configured to modify the speed of the second input shaft. The major part of the power from the constant-speed driver is transmitted through the speed summing gear arrangement from the first input shaft to the output shaft thereof, without passing through the continuous variable transmission device. Only a fraction, in one embodiment less than 50%, in another embodiment less than 30%, more particularly less than 20% of the power from the constant-speed driver passes through the continuous variable transmission device, and is modulated thereby, to add or subtract speed via the second input shaft of the speed summing gear arrangement. The continuous variable transmission device is functionally coupled to the controller, such that the rotation speed of the output shaft of the speed summing gear arrangement, and thus the speed of the load which is drivingly coupled to said output shaft, can be modulated, while the rotation speed of the constant-speed driver, and thus of the first input shaft of the speed summing gear arrangement, can remain constant.

The first input shaft of the speed summing gear arrangement can be coupled to the constant-speed driver directly or indirectly, i.e. without or with a gear box, or any other mechanical device arranged therebetween. Thus, the first input shaft of the speed summing gear arrangement can rotate at the same rotation speed as the constant-speed driver, or at a different speed. Similarly the output shaft of the speed summing gear arrangement can be coupled to the load directly, or a gearbox can be provided between The output shaft and the load.

In some embodiments, the load can include one rotating machine, e.g. a centrifugal, axial or mixed compressor, or any other driven turbomachine, or a reciprocating compressor, or other rotating loads. In other embodiments, the load can comprise two or more rotating machines. These latter can require to rotate at the same or different rotation speeds. Gear boxes can be arranged between sequentially arranged rotating driven machines, to provide different rotation speeds, if needed.

In exemplary embodiments, the continuous variable transmission device comprises a mover member and a driven member. The mover member can be coupled to the constant-speed driver. The driven member can be arranged substantially coaxial to the mover member. The driven member can be coupled to the second input shaft of the speed summing gear arrangement.

According to some embodiments, the continuous variable transmission device comprises a magnetic coupling. The magnetic coupling can be comprised of a circular array of magnets co-acting with an electrically conductive member, wherein eddy currents are generated when the magnets and the electrically conductive member rotate one with respect to the other. The eddy currents co-act with the magnetic field generated by the magnets such that a torque is transmitted from the magnets arrangement to the electrically conductive member or vice-versa.

The magnetic coupling can use either permanent magnets, electromagnets or both. The amount of power transmitted through the magnetic coupling can be modulated, i.e. adjusted by controlling the intensity of the magnetic field, e.g. if electromagnets are used. In other embodiments, the power transmitted through the magnetic coupling can be modulated by adjusting the distance between the magnets and the electrically conductive member.

In other embodiments, the continuous variable transmission device comprises a hydro viscous driver. The hydro viscous driver comprises a driving member and a driven member. The driving member comprises at least one driving disc and the driven member comprises at least one driven disc. The two discs face each other and form a gap therebetween. In other embodiments the driving member comprises a plurality of driving discs and the driven member comprises a plurality of driven discs. Each driving disc is paired with a driven disc, such that each driven disc is arranged between two consecutively arranged driving discs and vice-versa. A gap is formed between each pair of driven disc and respective facing driving disc. The gaps are filled with a viscous liquid, which transmits by viscous friction the torque from the driving discs to the driven discs. The width of the gap between driven disc and driving disc of each pair can be adjusted to adjust the torque transmitted from the driving member to the driven member.

In further embodiments, the continuous variable transmission device can comprises: an input traction ring drivingly coupled to the constant-speed driver; an output traction ring drivingly coupled to the second input shaft of the speed summing gear arrangement; a plurality of traction planets, in frictional contact with the input traction ring and the output traction ring. Each traction planet is mounted on a planet axle operably configured to provide a tiltable axis of rotation for each traction planet. The torque transmitted through the continuous variable transmission device is modulated by adjusting the angular position of the tiltable axes of the traction planets.

The speed summing gear arrangement can comprise an epicyclic gear train. As understood herein in its broadest sense an epicyclic gear train is an arrangement of at least two mutually meshing gears, wherein at least one of said gear is idly supported on a rotating member, which rotates around the rotation axis of the other of said at least two mutually meshing gears. In the configurations disclosed herein the epicyclic gear train has at least two degrees of freedom and at least three meshing gears, whereof at least one (planet gear) is idly supported on a member (planet carrier), which rotates around a stationary axis of rotation of another one of the meshing gears forming the train.

The continuous variable transmission device can be comprised of, or combined with a fixed transmission ratio gear train, formed by a plurality of gears or toothed wheels arranged between the driver shaft and the second input shaft of the speed summing gear arrangement.

The present disclosure further concerns a method for operating a variable-speed rotating load, comprising the following steps:
  driving the rotating load with a constant-speed driver through a speed summing gear arrangement comprised of a first input shaft, a second input shaft and an output shaft, the first input shaft being drivingly coupled to the constant-speed driver and the output shaft being drivingly coupled to the load;
  varying the speed of the rotating load by transmitting a fraction of power from the driver through a continuous variable transmission device mechanically coupled to the driver and to the second input shaft of the speed summing gear arrangement.

Even though the arrangement disclosed herein is particularly useful and advantageous in systems wherein the main constant-speed driver is an electric motor, other main constant-speed drivers can be used instead, such as gas turbines or steam turbines. The system as described herein is suitable in all situations where the main constant-speed driver is a fixed or constant speed main machine. The system is useful whenever the main constant-speed driver is configured for rotating at a substantially constant rotational speed, which includes not only those drivers, which are constrained to rotate at a constant speed (such as electric motors devoid of a variable frequency driver or other frequency converting devices), but rather also those which are operated at constant speed, e.g. in order to maximize the efficiency thereof.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit embodiments of the invention.

Instead, the scope of embodiments of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
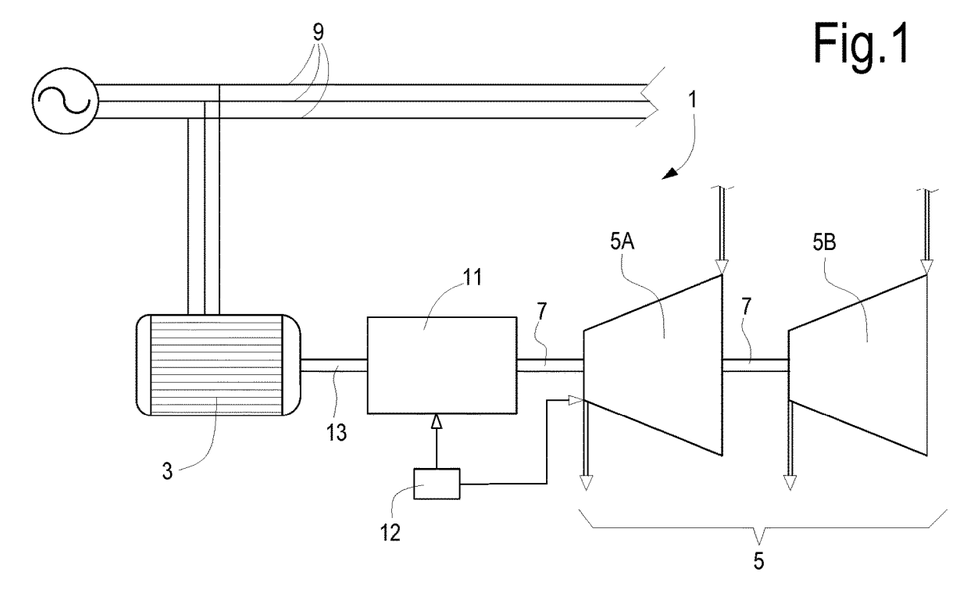
FIG. 1 schematically illustrates a first embodiment of a system according to the present disclosure.

Referring now to FIG. 1, in an embodiment a system 1 is comprised of a driver 3 and a rotating load 5. In the exemplary embodiment of FIG. 1 the rotating load 5 is comprised of two rotating machines 5A and 5B. One or both the rotating machines 5A, 5B can comprise a compressor, for instance a centrifugal compressor or an axial compressor, or a reciprocating compressor, or a combination thereof. In the following description it will be assumed by way of example that both rotating machines 5A, 5B are compressors. In FIG. 1 the two compressors 5A, 5B are mechanically coupled to a single shaft 7 and rotate therefore at the same speed. In other embodiments, a gearbox can for instance be arranged between the two compressors 5A, 5B, such that these latter can rotate at different rotational speeds.

In the embodiment of FIG. 1 the driver 3 can include an electric motor, powered by an electric power distribution grid 9. The driver 3 may be a constant-speed driver and rotate at a fixed, i.e. constant rotational speed, such that a variable frequency driver can be dispensed with.

In order to modify the rotational speed of the load 5, a variable speed transmission 11 is arranged along the shaftline between the driver 3 and the load 5. The variable speed transmission 11 can be functionally coupled to a controller 12, which is further interfaced with the load 5 or with the process, whereof the load 5 forms part. The controller 12 can be configured to modify the rotational speed of the shaft 7, which drivingly connects an output of the variable speed transmission 11 to the load 5, with respect to the fixed rotational speed of a shaft 13 drivingly connecting the driver 3 to an input of the variable speed transmission 11.

Figure 2:
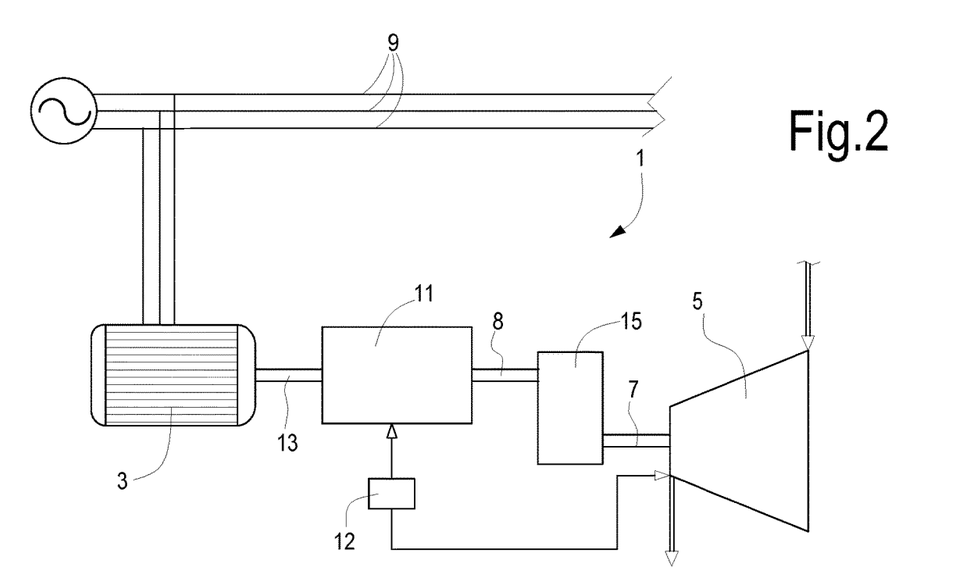
FIG. 2 schematically illustrates a second embodiment of a system according to the present disclosure.

FIG. 2 illustrates a further embodiment of a system according to the present disclosure. The same reference numbers designate the same components, elements or parts shown in FIG. 1 and which will not be described again. The main difference between the system of FIG. 1 and the system of FIG. 2 is a gearbox 15 arranged between the output shaft 8 of the variable speed transmission 11 and the shaft 7, which transmits motion to the load 5. The gearbox 15 can be used e.g. if the required speed transmission ratio between the output shaft 13 of the driver 3 and the load 5 cannot be achieved by the variable speed transmission 11 only.

Figure 3:
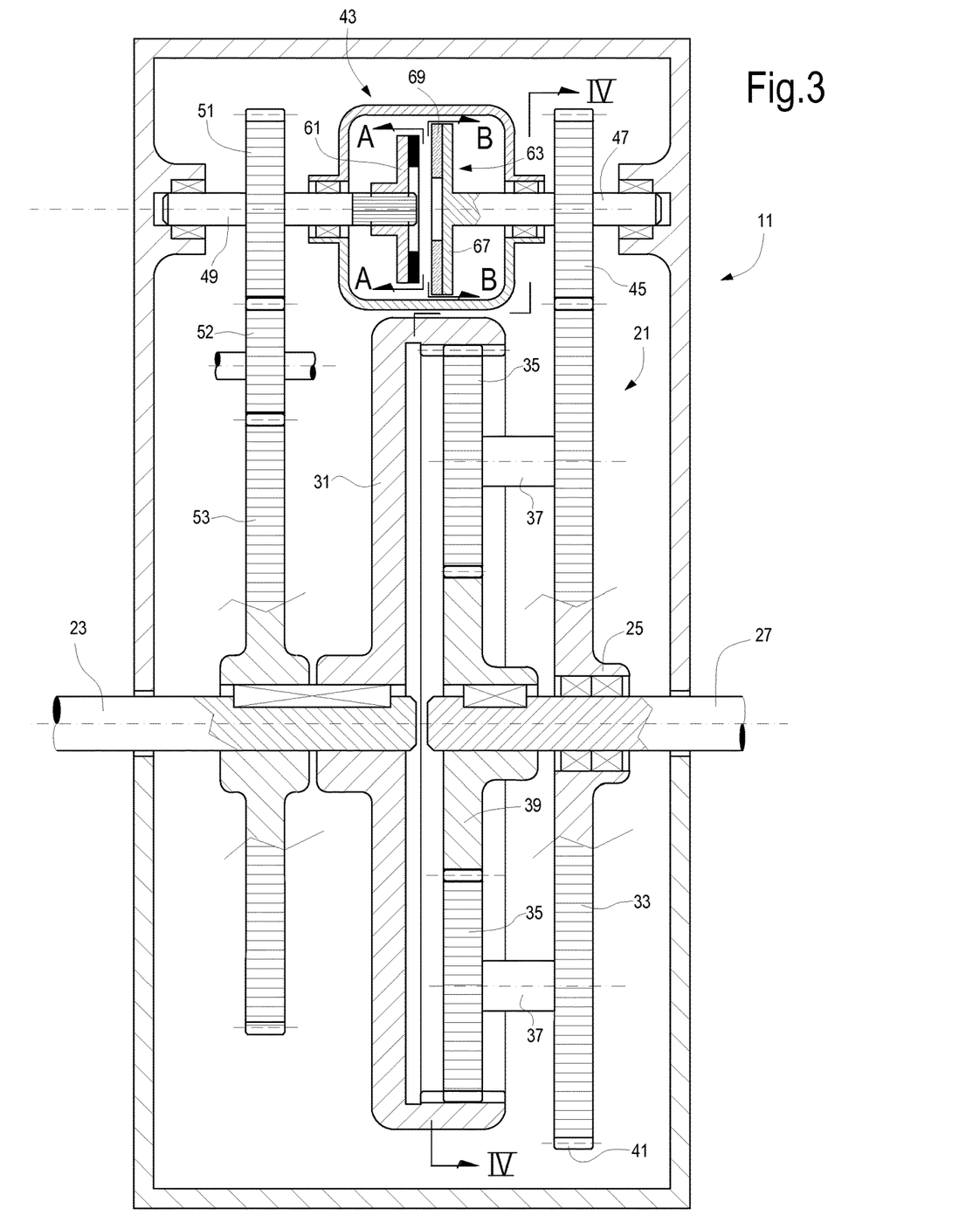
FIG. 3 illustrates a sectional view, according to line of FIG. 4, of an embodiment of a variable speed transmission for the systems of FIGS. 1 and 2.

Referring now to FIG. 3, with continuing reference to FIGS. 1 and 2, a possible embodiment of the variable speed transmission 11 will be described. The variable speed transmission 11 comprises a speed summing gear arrangement 21 comprised of a first input shaft 23, a second input shaft 25 and an output shaft 27. The output shaft 27 is mechanically coupled to shaft 7 (or to shaft 8 in the embodiment of FIG. 2), or may form part thereof. The input shaft 23 is mechanically coupled to shaft 13, or may form part thereof.

In the embodiment of FIG. 3 the speed summing gear arrangement 21 is an epicyclic gear train. The epicyclic gear train 21 comprises a ring gear 31 and a planet carrier 33, which supports a plurality of planet gears 35. Each planet gear 35 is idly mounted on the planet carrier 33 by means of a pin 37. The epicyclic gear train 21 further comprises a sun gear 39 keyed on the output shaft 27 and rotating therewith.

In the embodiment of FIG. 3 the ring gear 31 is an internal gear and the planet gears 35 are in mesh with the internal ring gear 31. The planet gears 35 are further in mesh with the sun gear 39. The ring gear 31 is keyed on the first input shaft 23 and rotates therewith around the axis of the ring gear 31 and of the sun gear 39, such that the ring gear 31, the sun gear 39 and the planet carrier 33 are coaxial.

The planet carrier 33 rotates with a gear 41, which can be formed integrally with the planet carrier 33. The gear 41 receives motion from a continuous variable transmission device 43. In the embodiment of FIG. 3 the continuous variable transmission device 43 is mechanically coupled to gear 41 via a pinion 45 that is keyed on an output shaft 47 of the continuous variable transmission device 43.

The continuous variable transmission device 43 further comprises an input shaft 49, which receives power from the driver 3, e.g. through the input shaft 23 of the variable speed transmission 11. In some embodiments, as shown in FIG. 3, a gear train 51, 53 can be arranged between the input shaft 23 of the variable speed transmission 11 and the input shaft 49 of the continuous variable transmission device 43. The gear train 51, 53 can be designed to provide the desired transmission ratio between shafts 23 and 49. In the exemplary embodiment of FIG. 3, the gear train further includes an idle gear 52, arranged between gears 51 and 53, to reverse the direction of rotation. In other embodiments, not shown, the idle gear 52 can be omitted. In some embodiments, an idle gear can be arranged between pinion 45 and gear 41.

Thus the epicyclic gear train 21 has two degrees of freedom and receives input power from the driver 3 directly and through the continuous variable transmission device 43. The gear train including gears 53, 52, 51, 45, 41, which are arranged along the transmission line that contains the continuous variable transmission device 43, defines a total transmission ratio which can be either positive or negative, depending upon the number of gears or toothed wheels arranged there along.

Figure 4:
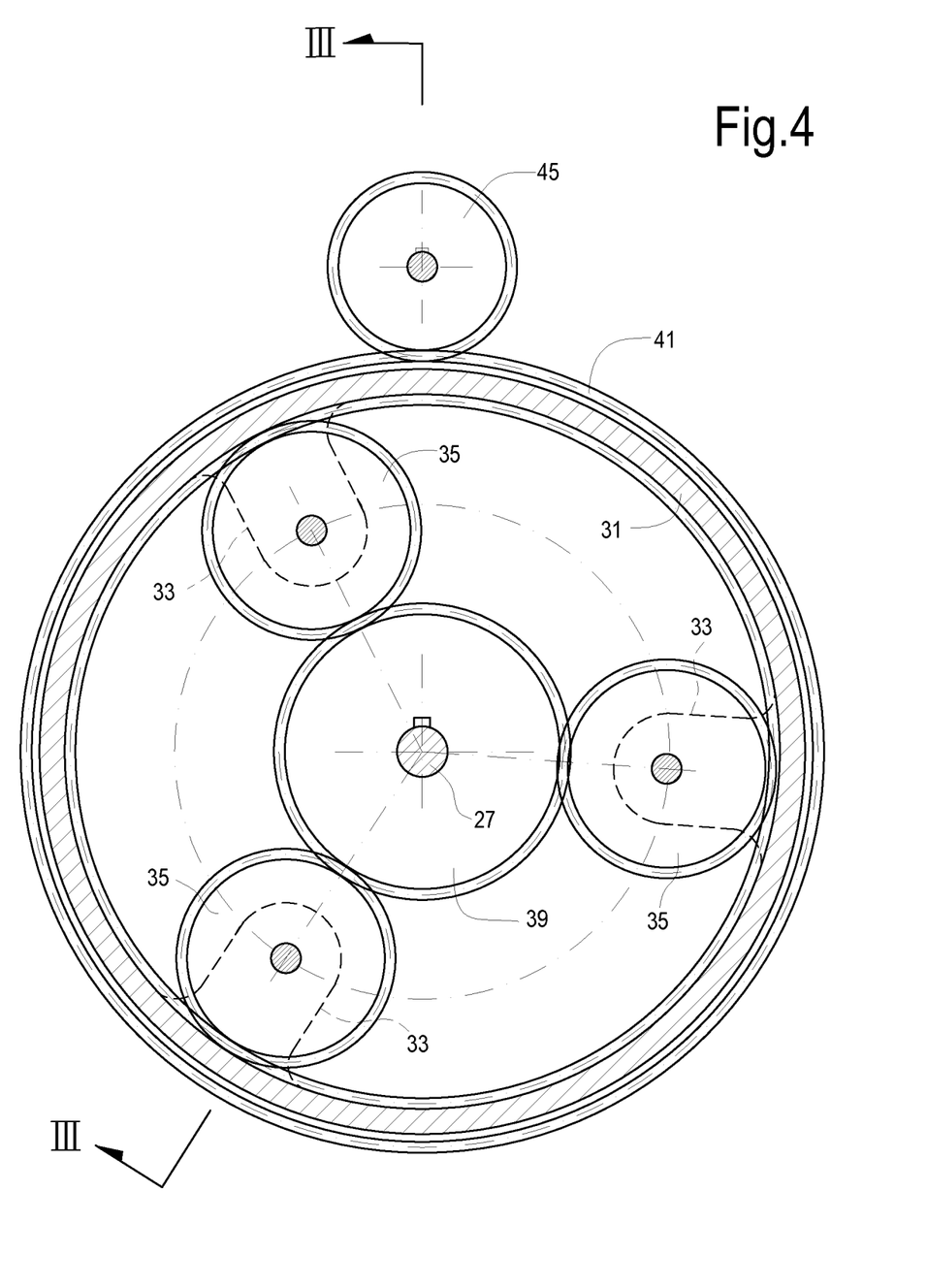
FIG. 4 illustrates a sectional view of the variable speed transmission according to line of FIG. 3.

As known, the speed ratio $\tau_0$ between the first gear and the last gear of an epicyclic gear train is given by Willis formula $$\tau_0 = \frac{\Omega_n - \Omega_p}{\Omega_1 - \Omega_p}$$

wherein:
$\Omega_n$ is the rotational speed of the last gear of the epicyclic gear train (in the embodiment of FIGS. 3, 4 the sun gear 39)
$\Omega_p$ is the rotational speed of the planet carrier (33 in FIGS. 3, 4)
$\Omega_1$ is the rotational speed of the first gear of the epicyclic gear train (in the embodiment of FIGS. 3, 4 the ring gear 31).

As shown by the Willis formula, the transmission ratio between the first input shaft 23 and the output shaft 27 can be adjusted by modulating the rotational speed of the planet carrier 33. The rotational speed of the planet carrier 33 can be controlled by controlling the rotational speed of the output shaft 47 of the continuous variable transmission 43.

The range of speed variation around a rated speed of the load 5 is usually small. The epicyclic gear train 21 can be designed such as to provide a speed transmission ratio which is suitable to drive the load 5 at a given pre-set rotational speed with the planet carrier 33 at standstill (i.e. $\Omega_p=0$). This condition can correspond to a given rotational speed of the load 5.

Variations of the rotational speed of the load are obtained via the continuous variable transmission device 43 through the speed summing gear arrangement 21, while the driver 3 is maintained at a stationary, constant rotational speed. Adjustment of the rotational speed of the output shaft 47 of the continuous variable transmission device 43 is obtained under the control of controller 12, as a function of the required rotational speed of the load 5.

Figure 3A:
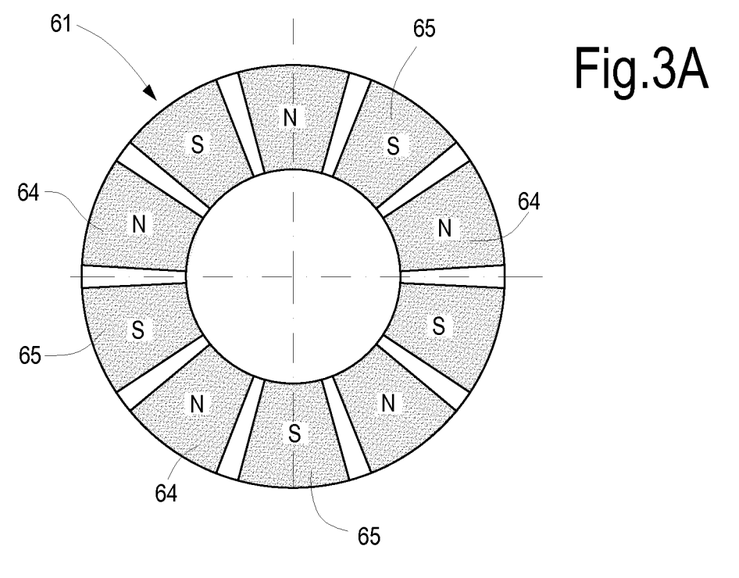
FIGS. 3A and 3B illustrate sectional views according to lines A-A and B-B in FIG. 3, respectively.

In the embodiment of FIGS. 3 and 4 the continuous variable transmission device 43 is a magnetic coupling device, comprised of a magnetic disk 61 and a ferromagnetic disk 63. In some embodiments the magnetic disk 61 can be comprised of a plurality of permanent magnets 64, 65, as best shown in FIG. 3A. The N and S poles of each permanent magnet 64, 65 are aligned parallel to the disk axis. The magnets 64, 65 are arranged in an alternate arrangement, such that each permanent magnet 64 having an N pole facing the opposite ferromagnetic disk 63 is arranged between two permanent magnets 65 having an S pole facing the opposite ferromagnetic disk 63. The ferromagnetic disk 63 comprises a soft-iron yoke 67 and an electrically conductive member 69, e.g. made of copper, aluminum, or any other electrically conductive material, arranged on the surface of the soft-iron yoke 67 facing the magnetic disk 61. In the illustrated embodiment the electrically conductive member 69 is in the form of a ring, and will be therefore referred to herein after also as the electrically conductive ring 69. The soft-iron yoke 67 and the permanent magnets 65 form a magnetic circuit with the electrically conductive ring 69 located inside the magnetic circuit.

As will be described herein after, reference being made to another embodiment, the arrangement of the magnets, of the electrically conductive member and of the ferromagnetic member can be different. For instance, the ferromagnetic member (i.e. the ferromagnetic, soft-iron yoke 67) and the electrically conductive member can form a sleeve or cylinder, which can be surrounded by circularly arranged magnets with alternate polarities.

When the magnetic disk 61 is driven into rotation, the movable magnetic field generated by the magnets 64, 65 generates eddy currents in the electrically conductive ring 69. The eddy currents interact with the magnetic field, such that a torque is transmitted between the magnetic disk 61 and the ferromagnetic disk 63. This latter starts rotating at a speed, which is lower than the speed of the magnetic disk 61. A slip speed is generated between the magnetic disk 61 and the ferromagnetic disk 63, such that the magnetic field and the eddy currents continue to interact generating a torque therebetween.

The torque transmitted through the continuous variable transmission device 43 and the slip speed are approximately linearly linked to one another and the relationship therebetween depends upon the air gap between the magnets 64, 65 and the electrically conductive ring 69. By modifying the air gap, the slip speed can be adjusted such that the output speed of the continuous variable transmission device 43 is set at the value required to obtain the desired rotational speed of the output shaft 27 through the speed summing gear arrangement 21.

In other embodiments, not shown, electromagnets can be used instead of permanent magnets 64, 65. In this case variable magnetization of the electromagnets can be used as a control parameter instead of, or in combination with, the adjustment of the air gap between the magnets and the electrically conductive ring 69.

Figure 3B:
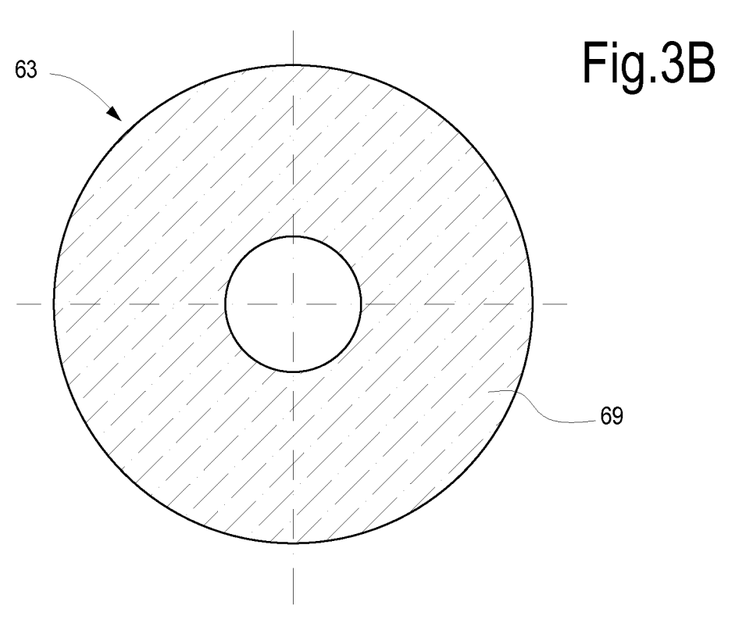
Figure 5:
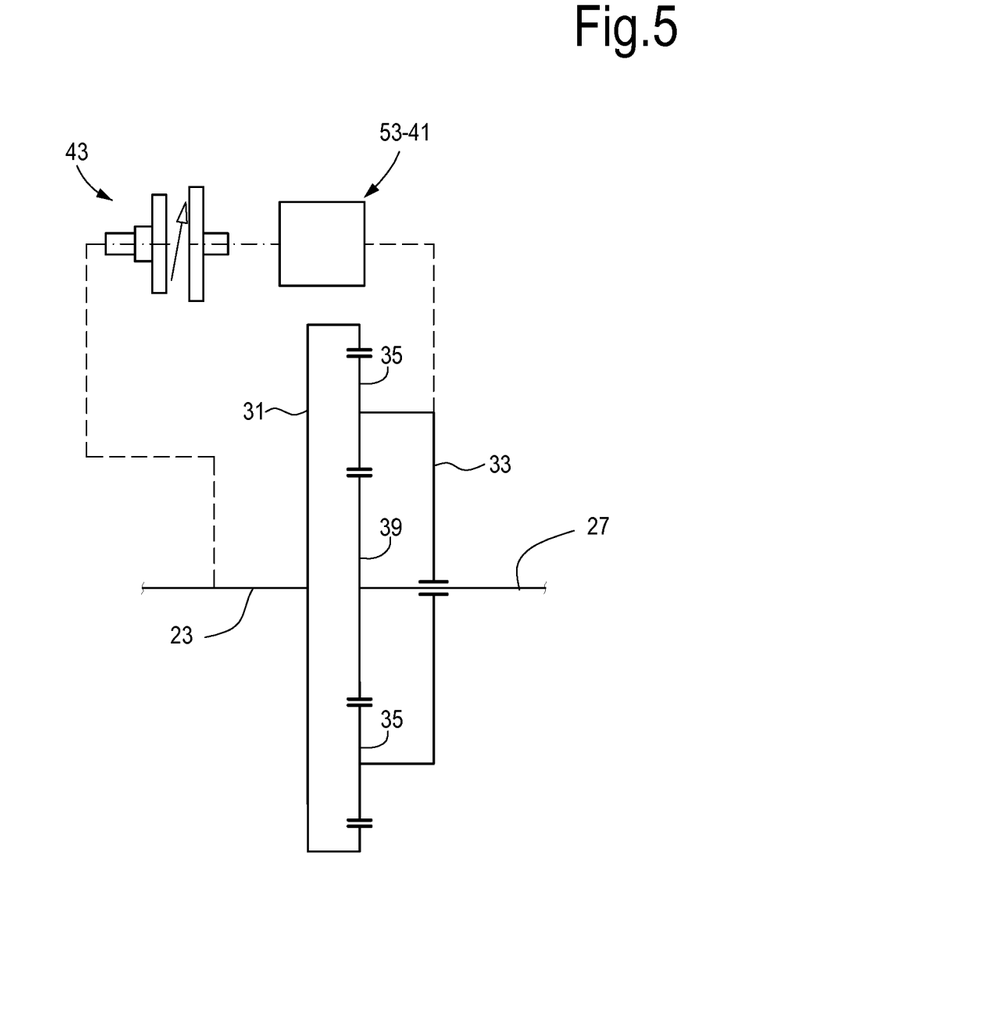
FIG. 5 illustrates a schematic of a the variable speed transmission of FIGS. 3 and 4.
Figure 6:
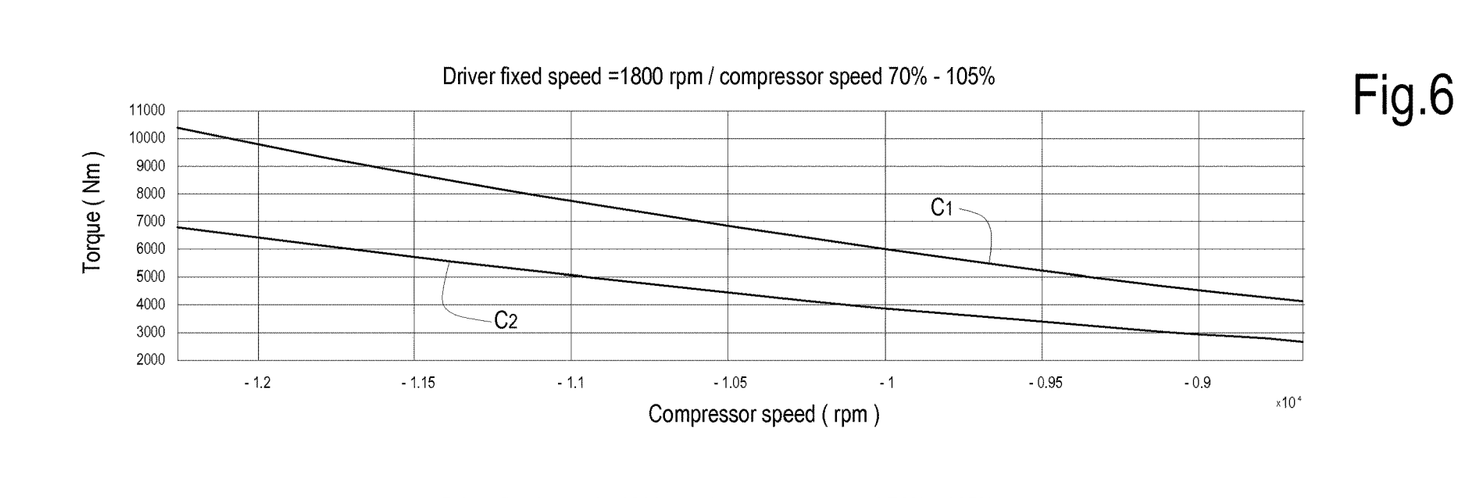
FIGS. 6 and 7 illustrate explanatory speed and torque diagrams.
Figure 7:
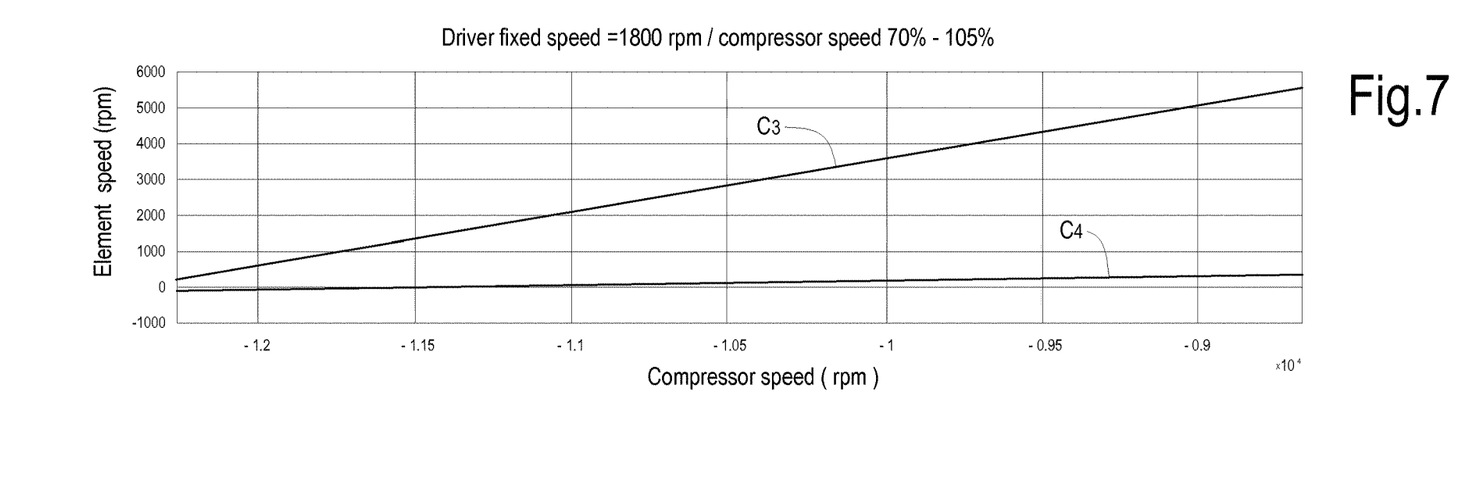

With continuing reference to FIGS. 3, 3A, 3B, a non-limiting, example of the operation of the variable speed transmission 11 is now described, reference being made to FIGS. 5 to 7. FIG. 5 illustrates a functional scheme of the variable speed transmission 11 described so far. The block labeled 53-41 functionally represents the gear train formed by gears 41, 45, 51, 52, 53. The gear train is represented as a single functional block, combined with the magnetic transmission. The gear train has a fixed transmission ratio $\tau_m$. In the present non-limiting exemplary embodiment the transmission ratio of the gear train is set $\tau_m=-0.09$. By way of example, the transmission ratio $\tau_0$ of the Willis formula is $\tau_0=-6.2$. As noted above, this is the transmission ratio between shafts 27 and 23 of the epicyclic gear train when the planet carrier 33 is stationary. The fixed rotation speed of the driver 3 and thus of the input shaft 23 is assumed to be 1800 rpm. The diagrams of FIGS. 6 and 7 illustrate the following curves:

C1: compressor torque, i.e. the torque applied to the output shaft 27;
C2: magnetic coupling; torque, i.e. the torque through the magnetic coupling 43;
C3: angular speed of the planet carrier 33;
C4: slip speed of the magnetic coupling 43, i.e. the difference between the angular speeds of disks 61 and 63.

On the horizontal axis of the diagrams in FIGS. 6 and 7 the angular speed of the load 5 is plotted. Diagrams in FIGS. 6 and 7 illustrate the behavior of the main parameters of the variable speed transmission 11 when the rotational speed of the load 5 varies.

Figure 8:
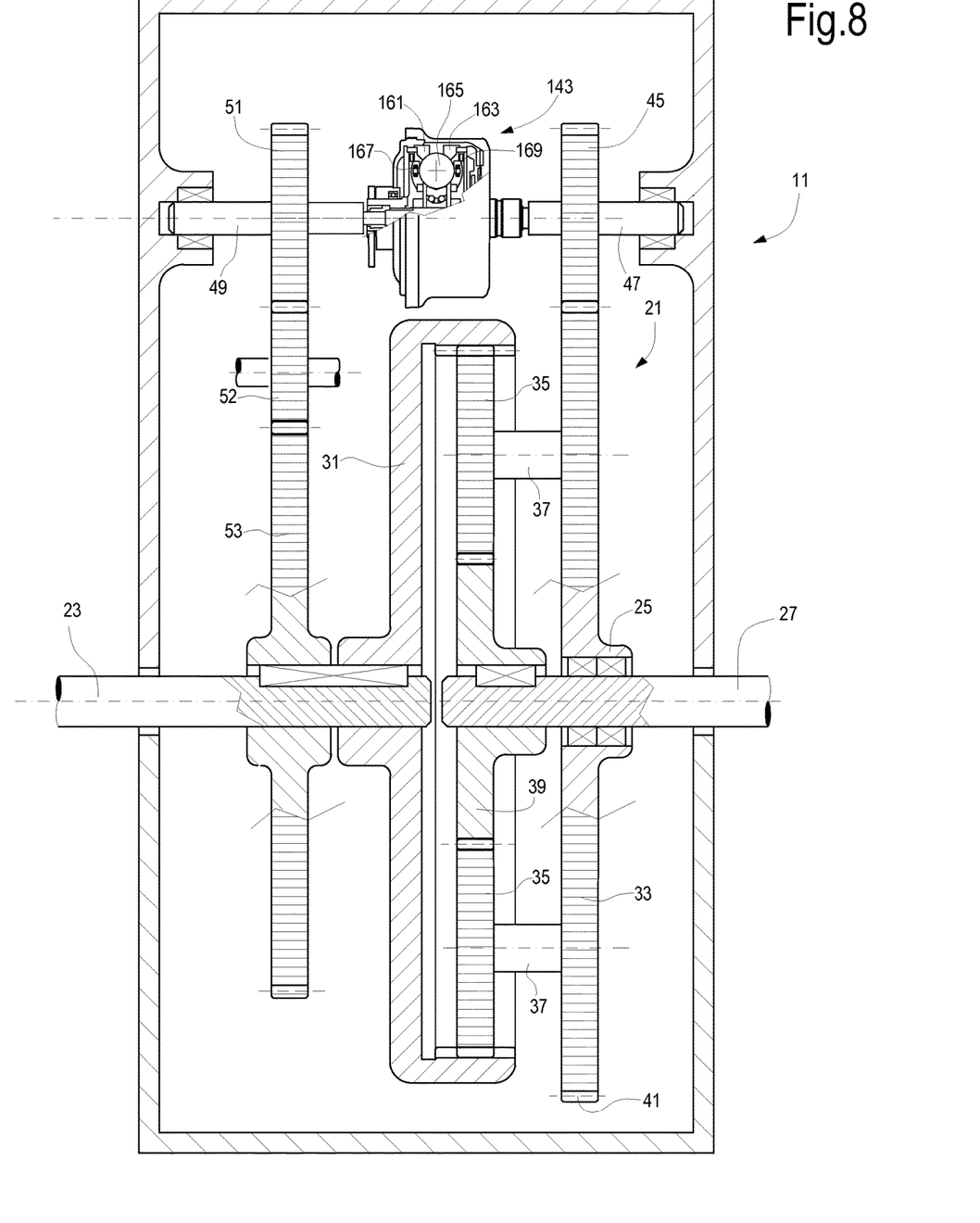
FIG. 8 illustrates a sectional view of a further embodiment of a variable speed transmission for the system of FIGS. 1 and 2.

FIG. 8 illustrates a further embodiment of the variable speed transmission 11, using a different continuous variable transmission device, which in FIG. 8 is labeled 143. The same reference numbers designate the same or equivalent components as shown in FIGS. 3 and 4, which will not be described again. In particular, the speed summing gear arrangement 21 is designed as in FIGS. 3 and 4.

In the embodiment of FIG. 8 the continuous variable transmission device 143 comprises a first, input traction ring 161 and a second, output traction ring 163. The first traction ring 161 is constrained to the input shaft 49 and rotates therewith, while the second traction ring 163 is constrained to the output shaft 47 and rotates therewith. The traction rings 161, 163 and the shafts 47, 49 are co-axial. Between the traction rings 161, 163 a set of traction planets 165, e.g. in the form of spheres, are arranged circumferentially around the axis of the traction rings 161, 163. Each traction planet 165 is frictionally in contact with both traction rings 161, 163. Torque is transmitted from the first traction ring 161 to the second traction ring 163 through the traction planets 165 by friction.

Each traction planet 165 is idly mounted on a rotation axle, which is supported at both ends 167, 169 by carriers which are designed to simultaneously tilt the rotation axis of each traction planet 165 in a respective plane containing the axis of the traction rings and the rotation axis of the traction planet. By tilting the rotation axis, the distance between the point of contact of each traction planet 165 and the first and second traction rings 161, 163 changes, thus modifying the transmission ratio between the first traction ring 161 and the second traction ring 163.

More details on a continuous variable transmission device as shortly described above can be found e.g. in EP-B-2620672, the content whereof is incorporated herein by reference.

The operation of the variable speed transmission 11 of FIG. 8 is similar to the operation of the embodiment of FIGS. 3 and 4. By changing the angular position of the rotation axes of the traction planets 165, the torque transmitted to the planet carrier 33 changes and the transmission ratio of the speed summing gear arrangement 21 is adjusted according to needs, such that the rotational speed of the load 5 can be changed while the driver 3 rotates at constant speed.

Figure 9:
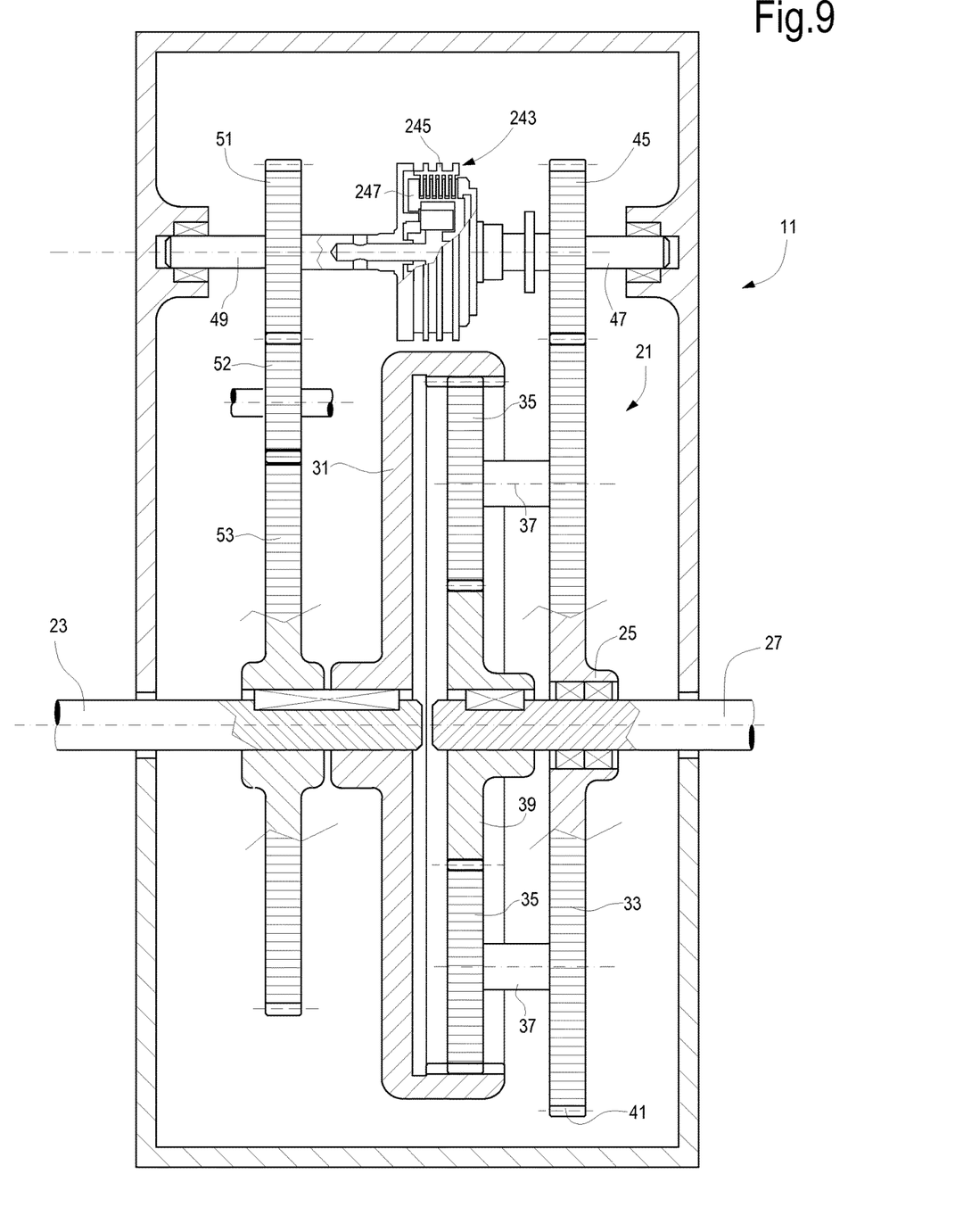
FIGS. 9 and 10 illustrate sectional views of yet further embodiments of variable speed transmissions for the system of FIGS. 1 and 2.

FIG. 9 illustrates a further embodiment of a variable speed transmission 11 suitable for the system of FIGS. 1 and 2. The same reference numbers designate the same or equivalent components as shown in FIGS. 3 and 4, which will not be described again. In particular, the speed summing gear arrangement 21 is designed as in FIGS. 3 and 4. A different continuous variable transmission device is used, instead of the magnetic device 43 of FIGS. 3, 4. The continuous variable transmission device of FIG. 6 is labeled 243.

The continuous variable transmission device 243 is a hydro viscous driver comprising friction discs 245 mounted on shaft 49 and rotating therewith, as well as friction discs 247 mounted on shaft 47 and rotating therewith. In some embodiments, a plurality of friction discs 247 and a plurality of friction discs 245 are interposed one between the other, such that each friction disc 247 is arranged between two adjacent friction discs 245 and vice-versa. Between pairs of friction discs 245, 247 a viscous liquid is provided, which transmits motion by friction between the friction discs, while direct mechanical contact between the discs is avoided. The gap between friction discs 245 and friction discs 247 can be adjusted such as to vary the torque which is transmitted from shaft 49 and discs 245 to discs 247 and shaft 47.

By adjusting the torque transmitted through the continuous variable transmission device 243 the speed of the planet carrier 33, and thus the transmission ratio between shaft 23 and shaft 27, can be modified.

Figure 10:
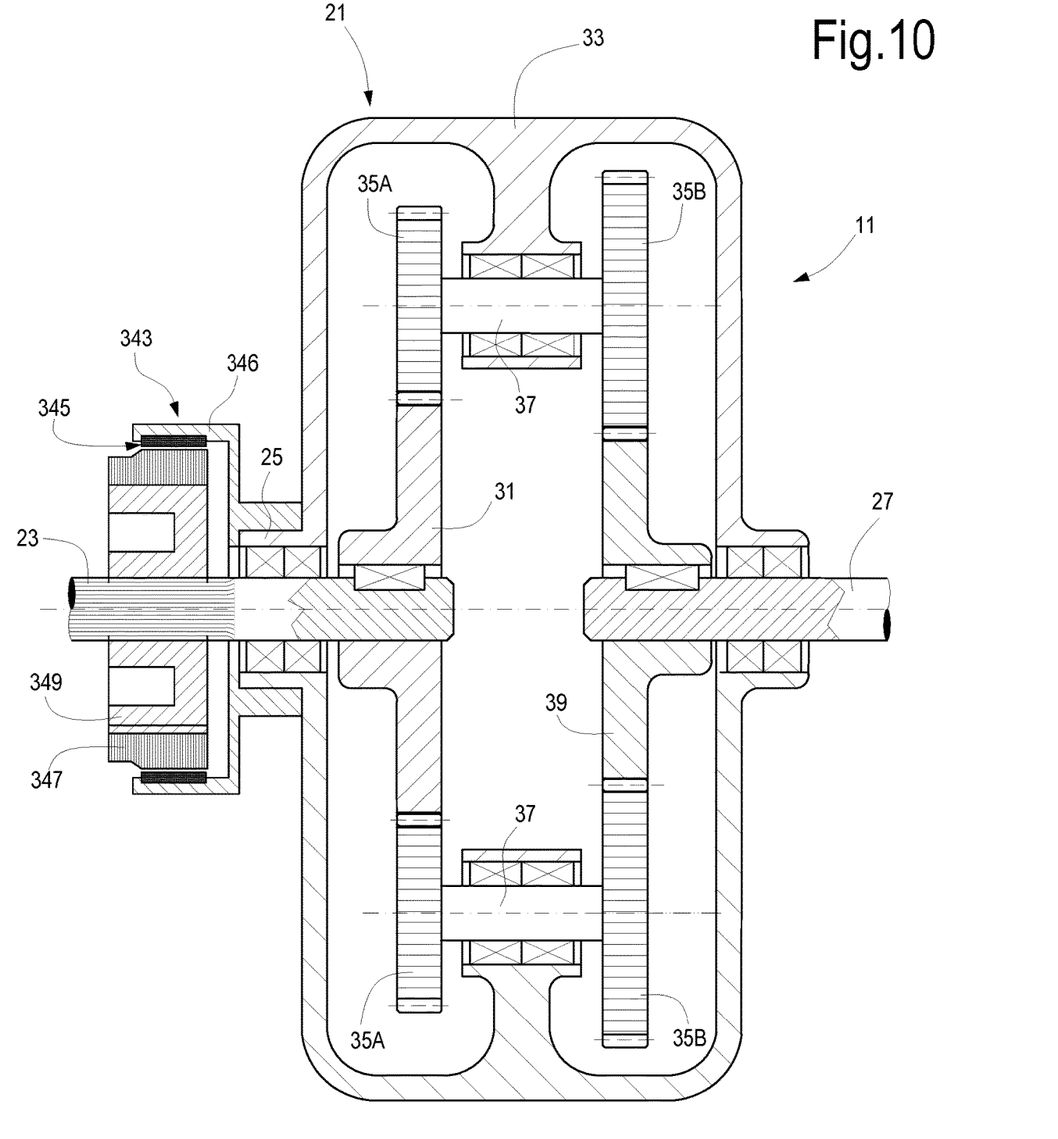

FIG. 10 illustrates a sectional view of a further variable speed transmission 11 suitable for use in systems of FIGS. 1 and 2. The variable speed transmission 11 again includes a speed summing gear arrangement 21 with a first input shaft 23 coupled to or forming part of shaft 13 and an output shaft 27 coupled to or forming part of shaft 7 (or shaft 8). In the embodiment of FIG. 10 the speed summing gear arrangement 21 is a complex epicyclic gear train. The epicyclic gear train 21 comprises a ring gear 31, keyed on the input shaft 23, and a planet carrier 33, which supports pairs of planet gears 35A, 35B, i.e. a so-called compound planetary arrangement. Each pair of planet gears 35A, 35B is idly supported through a shaft 37 on the planet carrier 33. The first planet gear 35A of each planet gear pairs is in mesh with the ring gear 31. The second planet gear 35B of each planet gear pairs is in mesh with a sun gear 39, keyed on output shaft 27.

The variable speed transmission 11 further comprises a continuous variable transmission device 343, which in the embodiment of FIG. 10 is a magnetic device, operating on the same principle as the continuous variable transmission device 43 of FIGS. 3 to 7.

In the embodiment of FIG. 10 the continuous variable transmission device 343 is coaxial with the speed summing gear arrangement 21. Similar to FIGS. 3 to 5, the continuous variable transmission device 343 comprises a set of circularly arranged magnets co-acting with an electrically conductive member coaxial to the magnets and arranged in a magnetic circuit including the magnets and a soft-iron yoke or another similar ferromagnetic member. In the embodiment of FIG. 10 the magnets are schematically shown at 345 and the electrically conductive member is shown at 347. The soft-iron yoke (or any other ferromagnetic member) is shown at 349. In this exemplary embodiment the magnets 345 and the electrically conductive member 347 are arranged one inside the others. The magnets 345 comprise a set of circularly arranged magnets, with alternate polarities, as disclosed in connection with the continuous variable transmission device 43 of FIGS. 3, 3A, 3B and 4. In the embodiment of FIG. 10 alternate poles of the circularly arranged magnets are positioned so as to radially facing the electrically conductive member 347.

The electrically conductive member 347, for instance a copper sleeve, and the ferromagnetic yoke 349 are keyed on the shaft 23 and rotate therewith at the same rotational speed. The magnets 345 are mounted on a sleeve 346 which is integral with a second input shaft 25 of the speed summing gear arrangement 21. The second input shaft 25 is integral with the planet carrier 33 and rotates therewith.

The slip speed between the electrically conductive member 347 and the magnets 345 generate eddy currents in the electrically conductive member 347, which interact with the magnetic field and generate a torque which is transmitted from the shaft 23 to the planet carrier 33 through shaft 25.

The same torque can be transmitted through the continuous variable transmission device 343 at different speeds by adjusting the interaction between the magnets 345 and the electrically conductive member 347, such that the slip between these latter changes. As a consequence of the slip change, the rotational speed of the planet carrier 33 also changes and this modifies the transmission ratio of the epicyclic gear train 21. If permanent magnets 345 are used, the interaction between the magnets 345 and the electrically conductive member 347 can be changed by modifying the axial position of the electrically conductive member 347 with respect to the magnets 345.

In other embodiments, the magnets 345 can be electromagnets instead of permanent magnets. In such case the transmission ratio can be adjusted by acting upon the magnetization of the electromagnets instead of or in addition to acting upon the mutual axial position between the magnets and the electrically conductive member 347.

While in FIG. 10 the magnets are mounted for co-rotation with the planet carrier 33 and the ferromagnetic yoke 349 and the electrically conductive sleeve 347 are keyed on shaft 23 for rotation therewith, an opposite arrangement is not excluded, wherein the magnets 345 are mounted for co-rotation on the shaft 23 and the electrically conductive sleeve 347 and relevant ferromagnetic yoke 349 are integrally mounted on the planet carrier 33 for co-rotation therewith.

The epicyclic gear train 21 of FIG. 10 can be used in combination also with continuous variable transmission devices based on traction rings and traction planets as shown in FIG. 8, or on hydro viscous drives as shown in FIG. 9.

The configuration of FIG. 10 has the advantage, over the embodiments of FIGS. 3 to 9, that speed summing gear arrangement 21 and the continuous variable transmission device are coaxially arranged. The number of gears is reduced and thus the overall efficiency is improved.

The speed summing gear arrangements 21 shown in FIGS. 3 to 10 are configured such that the sun gear 39 is keyed on the output shaft 27, i.e. the output of the speed summing gear arrangement 21 is the sun gear 39, while the first input shaft is shaft 23, drivingly coupled to the ring gear 31, and the second input shaft is the planet carrier 33, drivingly coupled to the continuous variable transmission device 43. This is not the only possible configuration for the speed summing gear arrangement 21. As known to those skilled in the art, epicyclic gear trains can be configured in several different ways and the various rotating members thereof can be used in different ways as input or output members.

For instance, the planet carrier 33 can be keyed on the input shaft 23 and the output shaft 47 of the continuous variable transmission device 43 can be drivingly coupled to the ring gear 31. The transmission ratio of the speed summing gear arrangement 21 would then be modulated by means of the variable speed transmission acting upon the ring gear 31.

In general the speed summing gear arrangement 21 can comprise an epicyclic gear train with two degrees of freedom, i.e. with two input shafts and one output shaft, wherein the output shaft is drivingly coupled to the load 5, the first input shaft is drivingly coupled to the driver 3 and the second input shaft is drivingly coupled to the continuous variable transmission device.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
a constant-speed driver;
a rotating load configured to be driven into rotation by the constant-speed driver;
a controller, for controllably changing a rotation speed of the load;
a variable speed transmission, arranged between the constant-speed driver and the load, the variable speed transmission comprising a speed summing gear arrangement with a first input shaft, an output shaft, and a second input shaft; and
a continuous variable transmission device mechanically coupled to the constant-speed driver and configured co-axially with the first input shaft, the second input shaft, and the output shaft of the speed summing gear arrangement so as to modify the speed of the second input shaft of the speed summing gear arrangement, the continuous variable transmission device comprising,
a sleeve formed integrally with the second input shaft of the speed summing gear arrangement, the sleeve having a bore co-axial with the first input shaft, and
a magnetic coupling having magnets mounted to an inner surface of the bore on the sleeve and an electrically-conductive member at least partially disposed in the bore and attached to the first input shaft so that the electrically-conductive member co-rotates with the first input shaft,
wherein the output shaft is drivingly coupled to the rotating load and the first input shaft is drivingly coupled to the constant-speed driver, and
wherein the speed of the output shaft is a function of the speeds of the first input shaft and of the second input shaft and the continuous variable transmission device is functionally coupled to the controller, such that the rotation speed of the rotating load drivingly coupled to the output shaft can be modulated, while the rotation speed of the constant-speed driver remains constant.

2. The system of claim 1, wherein the continuous variable transmission device comprises a mover member and a driven member; wherein the mover member is mechanically coupled to the constant-speed driver, and the driven member is mechanically coupled to the second input shaft of the speed summing gear arrangement.

3. The system of claim 2, wherein the mover member and the driven member are configured to transmit a variable torque therebetween, and wherein the speed of the second input shaft is modulated by adjusting the torque transmitted between the mover member and the driven member.

4. The system of claim 1, wherein the speed summing gear arrangement comprises an epicyclic gear train.

5. The system of claim 4, wherein the epicycle gear train comprises a compound planetary arrangement with a ring gear that is an outer gear, a sun gear, a planet carrier, and a plurality of planet gears that comprises at least one pair of a first planet gear and a second planet gear supported on a common axis with respect to the planet carrier, and wherein the first planet gear is in mesh the ring gear and the second planet gear is in mesh the sun gear.

6. The system of claim 1, wherein the continuous variable transmission device is configured to be combined with a fixed-ratio gear train formed by a plurality of gears or toothed wheels arranged between the first input shaft and the second input shaft of the speed summing gear arrangement.

7. The system of claim 1, wherein the electronically-conductive member comprises a ferromagnetic yoke.

8. The system of claim 1, wherein the electronically-conductive member comprises a ferromagnetic yoke coupled with the second input shaft and a copper sleeve that circumscribes the ferromagnetic yoke.

* * * * *